UNITED STATES PATENT OFFICE.

ADOLF ISRAEL AND RICHARD KOTHE, OF ELBERFELD, GERMANY, ASSIGNORS TO THE FARBENFABRIKEN OF ELBERFELD COMPANY, OF NEW YORK.

BLUE-RED AZO DYE AND PROCESS OF MAKING SAME.

SPECIFICATION forming part of Letters Patent No. 662,122, dated November 20, 1900.

Application filed May 28, 1900. Serial No. 18,244. (No specimens.)

*To all whom it may concern:*

Be it known that we, ADOLF ISRAEL and RICHARD KOTHE, doctors of philosophy, chemists, residing at Elberfeld, Germany, (assignors to the FARBENFABRIKEN OF ELBERFELD COMPANY, of New York,) have invented a new and useful Improvement in Azo Dyes; and we hereby declare the following to be a clear and exact description of our invention.

In the two applications for Letters Patent bearing Serial Nos. 11,239 and 11,240, filed April 2, 1900, we have described the production of new urea and thio-urea compounds having the formula:

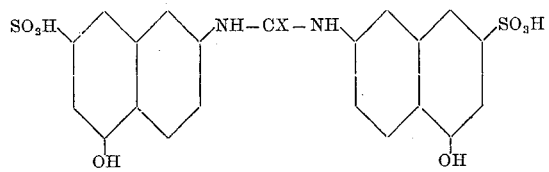

in which formula X means an atom of oxygen, which may be replaced by an atom of sulfur.

Our present invention relates to the production of valuable new azo coloring-matters by causing two molecules of two different suitable diazo compounds to act on the said urea or thio-urea compounds. We point out specifically that we intend to denote in the following specification by the term "diazo compound" as well a simple diazo compound as a diazotized amidoazo compound such as diazoazobenzene, diazoazotoluene, or the like.

The new dyestuffs prepared in the above-defined manner are alkaline salts of acids having most probably the following general formula:

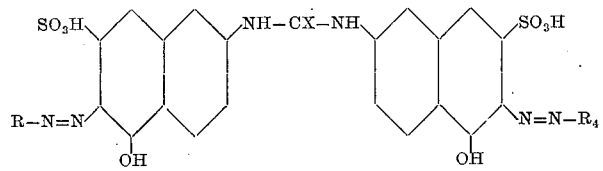

in which formula X means an atom of oxygen which may be replaced by an atom of sulfur, the groups $-N=N-R$ and $-N=N-R_1$ meaning two different radicals of diazo compounds, such as diazobenzene, diazotoluene, diazoazobenzene, acetylamidodiazobenzene, beta-diazonaphthalene, or the like, and are from reddish-brown to dark-brown powders having a metallic luster, soluble in water with from orange to red to bluish-red color, being insoluble in concentrated hydrochloric acid. They dye unmordanted cotton from orange to red shades which are of a remarkable fastness to light.

In carrying out our new process practically we can proceed as follows, the parts being by weight: 6.65 parts of anilin are diazotized in the usual manner with the aid of twenty-eight parts of hydrochloric acid (of 15° Baumé) and five parts of sodium nitrite. The resulting diazo solution is then slowly stirred into a solution prepared from 39.2 parts of the sodium salt of "carbonyldioxydinaphthylamindisulfonic" acid, which is the scientific name of one of the new urea compounds, (prepared from $beta_1$-amido-$alpha_3$-naphthol-$beta_4$-sulfonic acid,) which solution is previously mixed with forty parts of a twenty-per-cent. solution of sodium acetate, and slightly acidulated by means of acetic acid. The formation of the dyestuff will be finished after the solution has been stirred for one day. Subsequently forty parts of sodium carbonate ($Na_2CO_3$) are added to the reaction mixture in order to render it alkaline. To the resulting liquid a diazo solution prepared from 10.7 parts of acetyl-para-phenylenediamin with the aid of five parts of sodium nitrite and twenty-eight parts of hydrochloric acid (of 15° Baumé)

is slowly added. After being stirred for several hours the formation of the dyestuff will be complete. It is then precipitated by the addition of common salt, filtered off, and dried. The new coloring-matter thus obtained is the sodium salt of an acid having most probably the following formula:

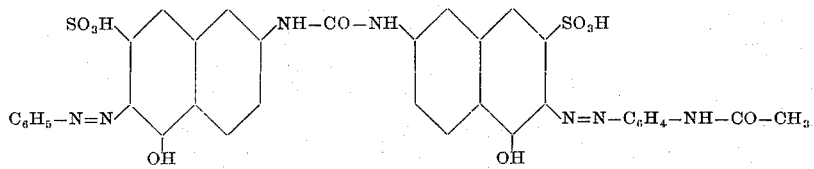

and is a reddish-brown powder having a metallic luster, soluble in water with a red color. It is insoluble in concentrated hydrochloric acid, while it is dissolved by concentrated sulfuric acid (of 66° Baumé) with a bluish-red color, which is changed into violet on the addition of a small quantity of ice, while on the addition of a larger quantity of ice a brown precipitate is obtained.

The new coloring-matter dyes unmordanted cotton red shades, which are fast to acids and to light.

The process proceeds in an analogous manner if instead of the diazo compounds mentioned in the example other diazo compounds are employed. On using, for instance, one molecule of diazotized anilin and one molecule of diazotized amidoazobenzene or one molecule of diazotized ortho-anisidin and one molecule of diazotized beta-naphthylamin bluish-red dyestuffs are obtained.

Having now described our invention and in what manner the same is to be performed, what we claim as new, and desire to secure by Letters Patent, is—

1. The process for producing new azo dyestuffs which processs consists in first combining two molecules of two different diazo compounds with one molecule of an urea derivative having the general formula:

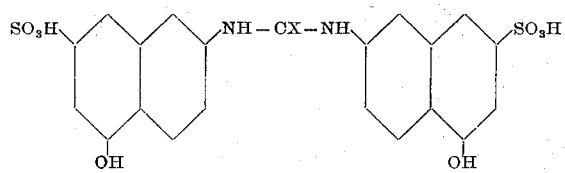

in which formula X means an atom of oxygen which may be replaced by an atom of sulfur, secondly precipitating the resulting dyestuff by means of a suitable salt and finally isolating the same from the reaction mixture, substantially as hereinbefore described.

2. The process for producing a new disazo dyestuff which process consists in first combining one molecule of diazotized anilin and one molecule of diazotized acetyl-para-phenylene-diamin with one molecule of carbonyldioxy-dinaphthylamin disulfonic acid having in a free state the formula:

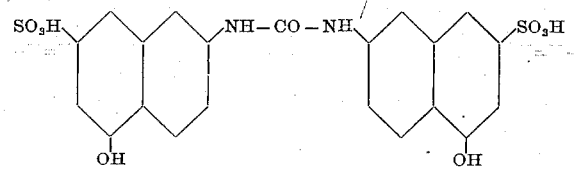

secondly precipitating the resulting dyestuff with the aid of a suitable salt, and finally isolating the same from the reaction mixture, substantially as hereinbefore described.

3. The herein-described new azo dyestuffs which are alkaline salts of acids having most probably the general formula:

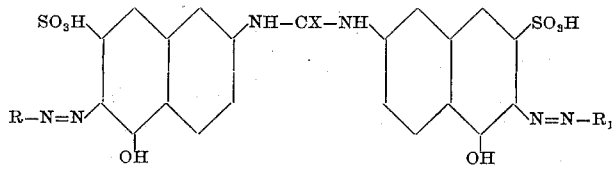

X meaning in this formula an atom of oxygen which may be replaced by an atom of sulfur, the groups $-N=NR$ and $-N=NR_1$ meaning the radicals of two different "diazo compounds" and which are from reddish-brown to dark-brown powders having a metallic luster, soluble in water with from orange to red to bluish-red color, insoluble in concentrated hydrochloric acid, dyeing unmordanted cotton from orange to red shades which are fast to light, substantially as hereinbefore described.

4. The herein-described new disazo dyestuff being an alkaline salt of an acid having most probably the following formula

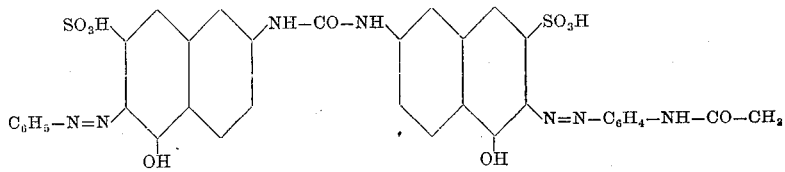

which in the form of its sodium salt is a reddish-brown powder having a metallic luster, soluble in water with a red color, insoluble in concentrated hydrochloric acid, being dissolved by concentrated sulfuric acid (of 66° Baumé) with a bluish-red color which is changed into violet by the addition of a small quantity of ice, while on the addition of a larger quantity of ice a brown precipitate is obtained, dyeing unmordanted cotton red shades which are fast to acids and to light, substantially as hereinbefore described.

In testimony whereof we have signed our names in the presence of two subscribing witnesses.

ADOLF ISRAEL.
    RICHARD KOTHE.

Witnesses:
 OTTO KÖNIG,
 T. A. RITTERSHAUS.